United States Patent [19]

DiSanto et al.

[11] Patent Number: 5,174,882
[45] Date of Patent: Dec. 29, 1992

[54] ELECTRODE STRUCTURE FOR AN ELECTROPHORETIC DISPLAY APPARATUS

[75] Inventors: Frank J. DiSanto, North Hills; Denis A. Krusos, Lloyd Harbor, both of N.Y.

[73] Assignee: Copytele, Inc., Huntington Station, N.Y.

[21] Appl. No.: 796,761

[22] Filed: Nov. 25, 1991

[51] Int. Cl.⁵ .................................. G09G 3/20
[52] U.S. Cl. .................. 204/299 R; 204/180.1; 340/787
[58] Field of Search ..... 204/299 R, 299 PE, 299 ED, 204/180.1; 359/87, 54, 89, 68; 340/787, 788

[56] References Cited

U.S. PATENT DOCUMENTS

| | | | |
|---|---|---|---|
| 3,756,693 | 9/1973 | Ota | 204/299 PE |
| 4,449,125 | 5/1984 | Clerc et al. | 359/54 |
| 4,736,198 | 4/1988 | Tokuyama et al. | 359/89 |
| 4,838,657 | 6/1989 | Miura et al. | 359/87 |

FOREIGN PATENT DOCUMENTS

| | | | |
|---|---|---|---|
| 1-70728 | 3/1989 | Japan | 359/54 |
| 1-267519 | 10/1989 | Japan | 359/54 |

Primary Examiner—John Niebling
Assistant Examiner—John S. Starsiak, Jr.
Attorney, Agent, or Firm—Arthur L. Plevy

[57] ABSTRACT

Anode electrode structure (12) for a display such as an electrophoretic display panel. An anode electrode structure (12) which is fabricated in accordance with the present invention includes a multiplicity of anode line segments (2), (7), (13) and (18) wherein each anode line segment comprises at least a first and a second conductor. An embodiment of the inventive anode electrode structure (12) enables a selective erase operation of a line (8) in a display without partial erasure of adjacent lines (3), (14), (19).

20 Claims, 1 Drawing Sheet

ELECTRODE STRUCTURE FOR AN ELECTROPHORETIC DISPLAY APPARATUS

TECHNICAL FIELD

The present invention relates to a segmented type anode electrode for an electrophoretic display and, in particular, to an anode electrode for use in fabricating a flat panel display such as an electrophoretic display panel.

BACKGROUND ART

Electrophoretic displays are known which incorporate a plurality of parallel cathode lines and a plurality of transverse grid lines insulated from the cathode lines. The cathodes and grids are referred to as rows and columns and the terms can be interchanged. The grid cathode structure forms an X-Y matrix enabling one to address the display at each X-Y intersection to enable pigment particles to migrate to the anode electrode. Such electrophoretic displays have been the subject matter of other prior art patents and essentially the assignee herein, namely CopyTele, Inc. of Huntington Station, New York, has developed many such displays as well as operating techniques for such displays.

Referring to FIG. 1, it is well known to those of ordinary skill in the art that, a display is formed in an electrophoretic display panel 100 as a result of movement of electrically charged particles 110 that are suspended in a fluid 120 which is disposed within a panel structure 100, which panel structure supports the row 130 and column electrodes 140 and the anode electrode 150 structure. The movement of the electrically charged particles is caused by applying potentials to predetermined intersections of the row and column electrodes and to the anode electrode structure to provide predetermined electric fields. As described in U.S. Pat. No. 4,655,897, entitled "Electrophoretic Display Panels and Associated Methods", issued on Apr. 7, 1987 and in U.S. Pat. No. 4,850,819 entitled "Electrophoretic Display Panel Apparatus and Methods Therefor", issued on Jul. 25, 1989, a typical 8.5"×11" electrophoretic display panel having a resolution of 200 lines per inch comprises approximately 2200 cathode or row electrodes, approximately 1700 grid or column electrodes, and an overlying anode electrode structure.

There is an anode electrode structure which comprises conductor strips instead of a solid thin layer of ITO. This anode structure is described in a copending application entitled DUAL ANODE FLAT PANEL ELECTROPHORETIC DISPLAY, filed on May 1, 1989, Ser. No. 345,825 to Frank J. DiSanto and Denis A. Krusos and assigned to CopyTele, Inc., the assignee herein, which is now U.S. Pat. No. 5,053,763. In an electrophoretic display panel which is used to display characters, characters are formed utilizing a predetermined number of such anode conductor strips in a group, the predetermined number of anode conductor strips being referred to as a character line and each of the predetermined number of anode conductor strips in the character line being referred to as an anode line segment. For example, in a typical such electrophoretic display panel, a character line is comprised of 26 anode line segments, each of which is approximately 0.125" wide and each of which is spaced approximately 0.001" from adjacent segments.

As is well known to those of ordinary skill in the art, an entire electrophoretic display panel which is fabricated in accordance with the prior art described above can be erased by applying a negative voltage to all of the anode line segments in the anode electrode structure. In addition, to provide a "hold" mode of operation or a "write" mode of operation, which modes of operation are described in the U.S. patents identified above, a positive voltage is applied to all the anode line segments in the anode electrode structure. Further in addition, a "selective" erase operation of a multiplicity of character lines, each of which comprises a multiplicity of anode line segments, is achieved by applying a negative voltage to the anode line segments which comprise each of the selected character lines. However, when the above-described "selective" erase operation in such an electrophoretic display panel is utilized to erase a single character line by applying a negative voltage to the anode line segments for the selected character line, a part of adjacent character lines on either side of the selected character line are also erased. Although such partial erasure also occurs when a multiplicity of character lines are erased, partial erasure is particularly unacceptable when few character lines are erased because it produces a display which is illegible and hard to read.

In general, notwithstanding that movement of particles in the electrophoretic display panel is almost perpendicular to the anode and cathode surfaces, some inherent spreading occurs. We have discovered that this inherent spreading causes the above-described erasure of parts of character lines which are adjacent to a character line which is to be erased. Further, we have discovered that such partial erasure of adjacent character lines can be eliminated if the spacing between adjacent anode line segments is increased. However, such a solution is unsatisfactory because the amount of spacing which is required to eliminate the partial erasure is so large that the line structure of the display becomes noticeable to a viewer. The increased spacing also affects resolution as one could not achieve 200 lines per inch without proper line spacing.

As a result of the above, there is a need in the art for an anode electrode structure for a display and, in particular, for an electrophoretic display panel which provides selective erasure of lines without partial erasure of adjacent lines.

DISCLOSURE OF THE INVENTION

Embodiments of the present invention advantageously solve the above-identified need in the art by providing an anode electrode structure for a display and, in particular, for an electrophoretic display panel which provides selective erasure of a line without partial erasure of adjacent lines.

An embodiment of the present invention is an anode electrode structure which is comprised of a multiplicity of anode line segments wherein each anode line segment comprises at least a first and a second conductor. In a preferred embodiment of the present invention, the first conductor is larger than the second conductor and the inventive anode electrode structure is applied to an electrophoretic display.

One provides a full panel erase operation in an electrophoretic display panel fabricated using an embodiment of the present invention by applying a negative voltage to all anode line segments in the display panel, i.e., to the first and second conductor of each anode line segment. Further, with such a display panel, one provides a "hold" operation or a "write" operation by applying a positive voltage to all anode line segments in the display panel, i.e., to the first and second conductor of each anode line segment. Lastly, with such a display panel, one provides a selective erase operation by applying a negative voltage to a selected group of anode line segments, i.e., to the first and second conductor of each of the selected group of anode line segments, and by applying a positive voltage to all the other anode line segments in the display panel, i.e., to the first and second conductor of each of the other anode line segments.

Advantageously, in accordance with the present invention, the addition of a conductor between anode line segments of an anode electrode structure which is fabricated in accordance with the prior art eliminates partial erasure of lines which are adjacent to a line which is being erased. Further, as will be set forth in detail below, the additional conductor can be made sufficiently small that it is not visible to a viewer.

BRIEF DESCRIPTION OF THE DRAWINGS

A complete understanding of the present invention may be gained by considering the following detailed description in conjunction with the accompanying drawing, in which:

FIG. 2 shows, in pictorial form, a portion of a preferred embodiment of an anode electrode structure which is fabricated in accordance with the present invention for use in providing an electrophoretic display panel.

BEST MODE FOR CARRYING OUT THE INVENTION

Figure 1:
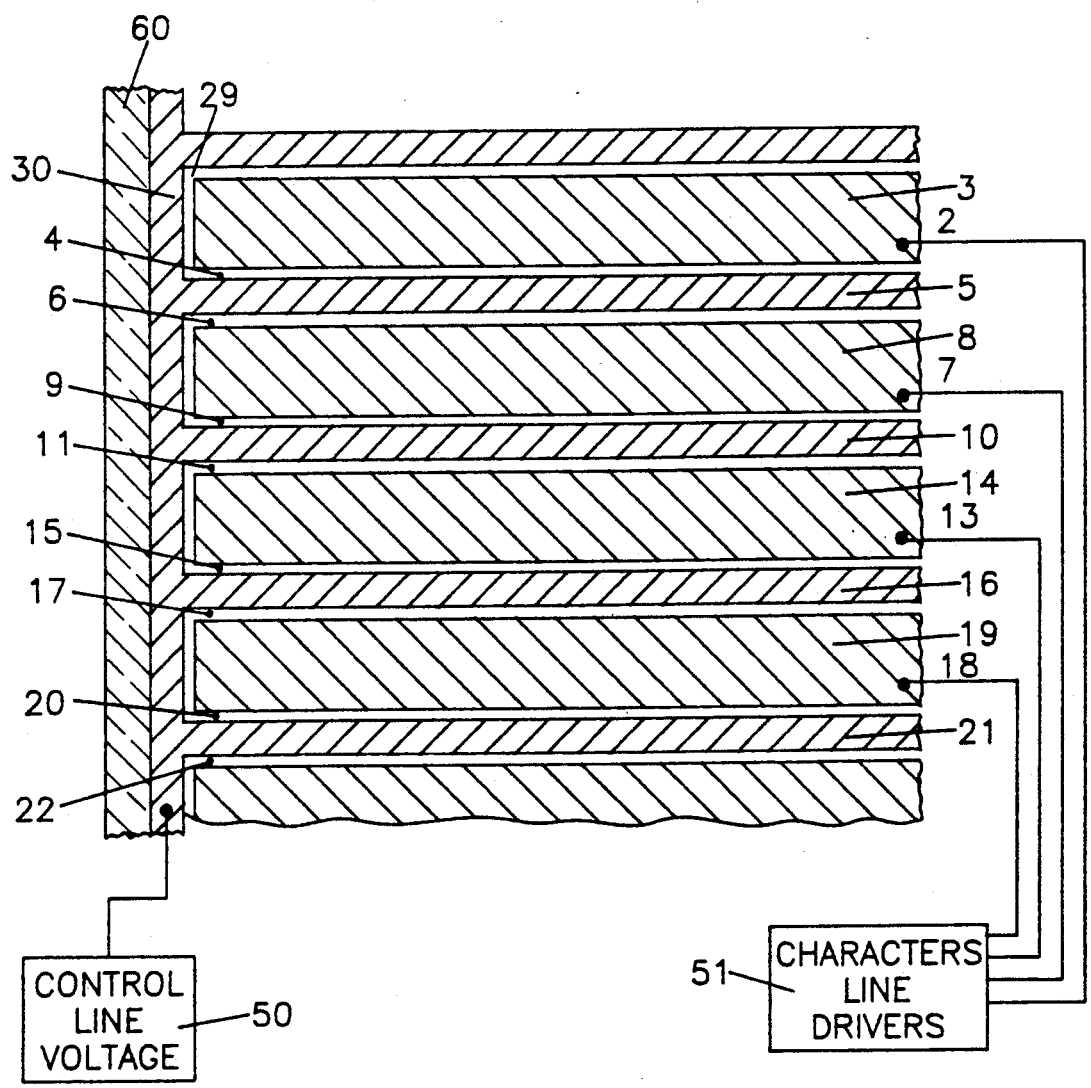
FIG. 1 shows an electrophoretic display as is known in the prior art in cross section.

FIG. 2 shows a preferred embodiment of anode electrode structure 12 for use in fabricating an electrophoretic display panel. Electrophoretic display panels are well known in the art and detailed descriptions regarding their fabrication and operation can be found in the U.S. Patents identified above in the Background of the Invention plus many others. Thus, for purposes of clarity, the following detailed description will only show details of the anode electrode structure of the present invention. Further, for purposes of illustration, the electrophoretic display panel which is fabricated using an embodiment of the inventive anode electrode structure is adapted to display characters. Lastly, in accordance with the present invention, a character line is formed utilizing a predetermined number of anode line segments wherein each anode line segment comprises a first and a second conductor.

FIG. 1 shows a portion of anode electrode structure 12 which is fabricated in accordance with the present invention and which forms a portion of a character line in the display. Typically, each anode line is fabricated from a thin layer of ITO deposited on a glass sheet. The ITO layers are practically transparent and fabricated on the glass sheet by conventional processing techniques as described in the above-noted patents. The ITO lines are deposited on a glass sheet 60. In particular, in a typical electrophoretic display panel which is fabricated in accordance with the present invention, a character line is comprised of 26 anode line segments. As shown in FIG. 1, anode electrode structure 12 is comprised of a multiplicity of anode line segments, however, only segments 2, 7, 13, and 18 are shown for the sake of clarity. In accordance with the present invention, each of anode line segments 2, 7, 13, and 18 is comprised of two, spaced apart conductors. In particular, anode line segment 2 is comprised of larger conductor strip 3 and smaller conductor strip 5; anode line segment 7 is comprised of a larger conductor strip 8 and smaller conductor strip 10; anode line segment 13 is comprised of larger conductor strip 14 and smaller conductor strip 16; and anode line segment 18 is comprised of larger conductor strip 19 and smaller conductor strip 21.

In a preferred embodiment of the present invention, larger conductor strips 3, 8, 14, and 19 are each 0.115" wide and smaller conductor strips 5, 10, 16, and 21 are each 0.013" wide. Further, the spaces between the conductors—spaces 4, 6, 9, 11, 15, 17, 20, and 22—are each 0.001" wide. As a result of this, each anode line segment in the preferred embodiment is 0.130" wide.

It should be appreciated that embodiments of the present invention are not limited to an anode electrode structure having the dimensions given above. For example, one may fabricate an anode electrode structure wherein larger conductor strips 3, S, 14, and 19 are each 0.110" wide; smaller conductor strips 5, 10, 16, and 21 are each 0.016" wide; and the spaces between the conductors—spaces 4, 6, 9, 11, 15, 17, 20, and 22—are each 0.002" wide. In such an embodiment, each anode line segment is 0.130" wide.

It should further be appreciated that embodiments of the present invention are not limited to an anode electrode structure having uniform dimensions. As such, an embodiment of the present invention may be fabricated so that a character line comprises anode line segments having dimensions first given above as well as anode line segments having dimensions second given above.

As shown in FIG. 1, smaller conductor strips 5, 10, 16, and 21 are all electrically connected. Such connections would apply for all anode line segments for a character line and there would typically be no such connection between similarly situated conductor strips in different character lines. Of course, it should be appreciated that the present invention does not require such electrical connection because appropriate voltages, as will be set forth in detail below, may be applied independently to these conductor strips. However, for a panel which is utilized in a character display mode, the electrical connection shown in FIG. 1 is preferred. In the preferred embodiment shown in FIG. 1, space 29 between one end of larger conductor strip 3 and conductor 30 is 0.0625" and conductor 30 is 0.0625" wide.

Table 1 helps illustrate the manner in which voltages are applied to anode electrode structure 12 for use in conjunction with an electrophoretic display panel to provide full panel erase, "hold", "write", and selective erase operations in accordance with the present invention. A full panel erase operation is provided by applying a negative voltage to all anode line segments 2, 7, 13, and 18, i.e., by applying a negative voltage to larger conductive strips 3, 8, 14, and 19 and by applying a negative voltage to smaller conductor strips 5, 10, 16, and 21. Further, a "hold" or a "write" operation is provided by applying a positive voltage to all anode line segments 2, 7, 13, and 18, i.e., by applying a positive voltage to larger conductive strips 3, 8, 14, and 19 and by applying a positive voltage to smaller conductor strips 5, 10, 16, and 21. Lastly, a selective erase operation of a character line is achieved by applying a negative voltage to all of the anode line segments of that character line and by applying a positive voltage to all the anode line segments of the other character lines.

TABLE I

| Operation | Voltages for Larger Conductor Strips | Voltages for Smaller Conductor Strips |
| --- | --- | --- |
| Full Panel Erase | −V | −V |
| Hold | +V | +V |
| Write | +V | +V |
| Selective Erase of a Character Line | −V for Erased Character Line<br>+V for Other Character Lines | +V |

Thus the above voltages are supplied by conventional circuitry as a control line voltage generator 50 for the control lines as 5, 10, and so on, and a character line driver circuit 51 for character lines. It is, of course, understood that the control lines above and below a character line can be separately energized during erasure of a separate character line; thus the control lines need not be connected together and hence can be separately energized according to Table I. Thus, if one wished to erase only line 8, one would place a negative voltage on character line 8 and a positive voltage on the control lines which of course are connected together. In any event, these lines need not be connected together. All other character lines as 3, 14 would receive a positive voltage while the control lines also receive the same positive voltage.

Those skilled in the art recognize that further embodiments of the present invention may be made without departing from its teachings and that the present invention is not limited to the specific embodiments described above.

We claim:

1. In an electrophoretic display having a fluid-tight envelope having a portion thereof which is at least partially transparent, an electrophoretic fluid contained within said envelope, said fluid having pigment particles suspended therein, and a cathode and grid electrode structure having a plurality of cathode and grid conductors passing through said envelope and said fluid, the improvement in combination therewith comprising:

an anode electric having a plurality of elongated parallel anode conductors passing through said envelope and said fluid and arranged in a multiplicity of groups of at least two conductors, one of the at least two conductors of each group of conductors being larger than another of each group of conductors.

2. The anode electrode structure of claim 1, wherein the larger conductor of each group has a larger width than another conductor of each group.

3. The anode electrode structure of claim 2, wherein the larger width of each of the multiplicity of groups of conductors is substantially the same.

4. The anode electrode structure of claim 2, wherein the larger width of some of the multiplicity of groups of conductors are not substantially the same.

5. The anode electrode structure of claim 2, wherein the conductors having a smaller width in a predetermined number of adjacent groups are electrically connected.

6. The anode electrode of claim 1, wherein each of said groups of conductors are fabricated from ITO deposited on a glass sheet.

7. An electrophoretic display, comprising:

a fluid tight housing having a portion thereof which is at least partially transparent, an electrophoretic fluid contained within said housing, said fluid having pigment particles suspended therein, and a cathode and grid electrode structure having a plurality of cathode and grid conductors passing through said housing and said fluid, an anode electrode located within said housing and having a first plurality of parallel character lines each separated one from the other by a predetermined distance and forming a grid of anode lines each line of a given length and width; and a second plurality of conductive control lines each also positioned between an associated first and second character line and each of relatively the same length as said associated character lines but of a lesser width, with at least one of said first plurality of character lines adapted to receive a different operating potential than said second plurality of control lines during at least one operating mode of said display.

8. The electrophoretic display according to claim 7, wherein said first and second lines are fabricated from ITO deposited on a glass sheet.

9. The electrophoretic display according to claim 8, wherein during an erase mode of said electrophoretic display, said character lines receive the same potential as said control lines.

10. The electrophoretic display according to claim 7, wherein during a "write" mode of said display, said character lines and said control lines receive a positive voltage.

11. The electrophoretic display according to claim 7, wherein during a hold mode said character lines receive the same polarity voltage as said control lines.

12. The electrophoretic display according to claim 7, wherein a single selected character line can be erased by applying a negative voltage to said selected line, with a positive voltage to all other character lines and with a positive voltage applied to said control lines.

13. A method of selectively erasing an electrophoretic display, comprising the steps of:

positioning a conductive control line beneath an anode character line in a display;

applying a voltage of a given polarity to said control line when an erase voltage of the opposite polarity is applied to said character line; and applying said given voltage to all other character lines not being erased.

14. The method according to claim 13, wherein said control line and said character line are both fabricated from ITO.

15. The method according to claim 13, wherein said erase voltage is a negative voltage.

16. The method according to claim 15, wherein said opposite polarity voltage is positive.

17. The method according to claim 13, wherein said conductive control line is of a significantly smaller area than said character line.

18. The method according to claim 13, wherein said control line is of the same length as said character line.

19. The method according to claim 13, wherein said control line is a smaller width than said character line.

20. The method according to claim 13, including the steps of positioning another conductive control line above said character line; and applying said voltage of said given polarity to said another conductive line when said erase voltage is applied to said character line.

* * * * *

UNITED STATES PATENT AND TRADEMARK OFFICE
CERTIFICATE OF CORRECTION

PATENT NO. : 5,174,882

DATED : December 29, 1992

INVENTOR(S) : DiSanto et al.

It is certified that error appears in the above-identified patent and that said Letters Patent is hereby corrected as shown below:

Col. 5, claim 1, line 43, after "anode" delete "electric" and
    insert therefor --electrode--.

Signed and Sealed this

Seventh Day of December, 1993

Attest:

BRUCE LEHMAN

Attesting Officer

Commissioner of Patents and Trademarks